(12) United States Patent
McGill et al.

(10) Patent No.: US 7,157,052 B1
(45) Date of Patent: *Jan. 2, 2007

(54) LINEAR CHEMOSELECTIVE CARBOSILANE POLYMERS AND METHODS FOR USE IN ANALYTICAL AND PURIFICATION APPLICATIONS

(75) Inventors: Robert A. McGill, Lorton, VA (US); Eric J. Houser, Nokesville, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 362 days.

This patent is subject to a terminal disclaimer.

(21) Appl. No.: 10/683,316

(22) Filed: Oct. 10, 2003

Related U.S. Application Data

(63) Continuation-in-part of application No. 09/895,292, filed on Jul. 2, 2001, now Pat. No. 6,660,230.

(60) Provisional application No. 60/215,070, filed on Jun. 30, 2000.

(51) Int. Cl.
*G01N 7/00* (2006.01)
(52) U.S. Cl. .................. 422/82.13; 422/69; 422/92; 436/104; 436/106; 436/148; 528/15; 528/25; 528/31; 528/36; 528/42; 528/43
(58) Field of Classification Search .............. None
See application file for complete search history.

(56) References Cited

U.S. PATENT DOCUMENTS

| | | |
|---|---|---|
| 5,151,110 A | 9/1992 | Bein et al. |
| 5,224,972 A | 7/1993 | Frye et al. |
| 5,306,642 A | 4/1994 | Reagen et al. |
| 5,589,396 A | 12/1996 | Frye et al. |
| 5,756,631 A | 5/1998 | Grate |
| 5,880,552 A | 3/1999 | McGill et al. |
| 5,972,638 A | 10/1999 | Burlage et al. |
| 6,015,869 A | 1/2000 | Grate et al. |

FOREIGN PATENT DOCUMENTS

FR   2815354 A1 * 4/2002

OTHER PUBLICATIONS

Levitsky et al. in Analytical Chemistry (2001), 73, 3441.*
Grate et al. in Analytical Chemistry (1999) 71, 1033.*
Jay W. Grate et at., "Hybrid Organic/Inorganic Copolymers with Strongly Hydrogen-Bond Acidic Properties for Acoustic Wave and Optical Sensors," Chem. Mater., 1997, 9, 1201-1207.
Jay W. Grate et al., "Hydrogen Bond Acidic Polymers for Surface Acoustic Wave Vapor Sensors and Arrays," Anal. Chem., 1999, 71, 1033-1040.
Igor Levitsky et al., "Rational Design of a Nile Red/Polymer Composite Film for Fluorescence Sensing of Organophosphonate Vapors Using Hydrogen Bond Acidic Polymers," Anal. Chem., 2001, 73, 3441-3448.
W. H. Urry et al., "Multiple Multicenter Reactions of Perfluoro Ketones with Olefins," J. Org. Chem., 1968, 33, 2302-2310.
Jay W. Grate, "Acoustic Wave Microsensor Arrays for Vapor Sensing," Chem. Rev., 2000, 100, 2627-2648.
R. Andrew McGill et al., "The NRL-SAWRHINO": a nose for toxic gases, Sens. Act. B, 2000, 65, 10-13.

(Continued)

*Primary Examiner*—Marc S. Zimmer
(74) *Attorney, Agent, or Firm*—Stephen T. Hunnius; John J. Karasek

(57) ABSTRACT

This invention relates generally to a new class of chemoselective polymer materials. In particular, the invention relates to linear polycarbosilane compounds for use in various analytical applications involving sorbent polymer materials, including chromatoghraphy, chemical trapping, analyte collection, and chemical sensor applications. These polymers have pendant and terminal aryl, alkyl, alkenyl, and alkynyl groups that are functionalized with halogen substituted alcohol or phenol groups, having the general structure:

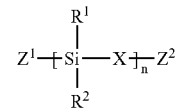

wherein n is an integer greater than 1;
wherein at least one of $R^1$ and $R^2$ is a linear or branched arm having at least one group independently selected from the group consisting of alkyl, alkenyl, alkynyl, and aryl groups, or combinations thereof, and having at least one halogen substituted alcohol or phenol groups attached thereto;
wherein any said $R^1$ and $R^2$ aryl groups are attached to said $[Si-X-]_n$ either directly or through a short hydrocarbon chain;
wherein any remaining said $R^1$ or $R^2$ group is a hydrocarbon or carbosilane group;
wherein X is a polymer component selected from the group consisting of alkylene, alkenylene, alkynylene, arylene groups, and combinations thereof; and
wherein $Z^1$ and $Z^2$ are end groups independently selected from the group consisting of alkyl, alkenyl, alkynyl, aryl, alkyl silanes, aryl silanes, hydroxyl, silicon hydride, alkoxides, phenols, halogen substituted alcohols, halogen substituted phenols, organosilyl, and combinations thereof.

These polymeric materials are primarily designed to sorb hydrogen bond basic analytes such as organophosphonate esters (nerve agents and precursors) and nitro-substituted compounds (explosives).

16 Claims, No Drawings

OTHER PUBLICATIONS

R. Andrew McGill et al., "Sorbent Coatings for Nitroaromatic Vapors: Applications with Chemical Sensors," SPIE P, 1998, 3392, 384-389.

R. Andrew McGill et al., "Performance Optimization of Surface Acoustic Wave Chemical Sensors," IEEE Transactions on Ultrasonics, Ferroelectrics, and Frequency Control, 1998, 45, 1370-1379.

R. Andrew McGill et al., "Choosing Polymer Coatings for Chemical Sensors," Chemtech, 1994, 24, 27-37.

Todd E. Mlsna et al., "The Design of Aromatic Acid Silicon Polymers and their Evaluation as Sorbent Coatings for Chemical Sensors," Silicones in Coatings II Conference, Mar. 24-26, 1998, 1-19.

Jay W. Grate et al., "AcousticWave Microsensors," Anal. Chem., 1993, 65, 940-948 and 987-993.

Eric Houser et al., "Rational materials design of sorbent coatings for explosives: applications with chemical sensors," Talanta, 2000, 1-17.

R. Andrew McGill et al., "The design of functionalized silicone polymers for chemical sensor detection of nitroaromatic compounds," Sensors and Actuators B, 2000, 65, 5-9.

* cited by examiner

LINEAR CHEMOSELECTIVE CARBOSILANE POLYMERS AND METHODS FOR USE IN ANALYTICAL AND PURIFICATION APPLICATIONS

This is a continuation-in-part application of application Ser. No. 09/895,292, U.S. Pat. No. 6,660,230, filed on Jul. 2, 2001, which claimed the benefit of a provisional application, U.S. Ser. No. 60/215,070 filed on Jun. 30, 2000. The entire contents of application Ser. No. 09/895,292 are incorporated herein by reference.

BACKGROUND OF THE INVENTION

1. Field of the Invention

This invention relates generally to a new class of chemoselective polymer materials. In particular, the invention relates to linear and branched polycarbosilane compounds for use in various analytical applications involving sorbent polymer materials, including chromatography, chemical trapping, and chemical sensor applications. These polymeric materials are primarily designed to sorb hydrogen bond basic analytes such as organophosphonate esters (nerve agents and precursors), and nitroaromatics (explosives).

2. Description of the Related Art

The use of sorbent chemoselective polymers for chromatography, chemical trapping, and chemical sensor applications is well established for technologies such as gas liquid chromatography, solid phase microextraction (SPME), and surface acoustic wave (SAW) sensors, respectively. In each application, the sorbent polymer is applied to a substrate as a thin film and analytes are sorbed to the polymer material. A typical configuration for a chemical sensor incorporates a thin layer of sorbent polymer deposited on a transducer that monitors changes in the physicochemical properties of the polymer film and translates these changes into an electrical signal that can be recorded.

By careful design of the polymer, both sensitivity and selectivity of a chemical sensor can be enhanced with respect to specific classes or types of analytes. Typically, a chemoselective polymer is designed to contain functional groups or active sites that can interact preferentially with the target analyte through dipole—dipole, van der Waals, or hydrogen bonding forces. The interaction between a chemoselective polymer and the analyte can even be regarded as a "lock and key" type interaction if multiple active sites in the polymer are spatially controlled so that an analyte with multiple functional sites can simultaneously interact with the polymer active sites.

The ideal polymer film for extended chemical sensor applications should exhibit reversible binding of analyte, high selectivity and high sorptivity, long term stability; and, as a thin film, offer fast sorption and desorption properties. To achieve these characteristics, a polymer must have physical properties that are amenable to rapid analyte sorption and desorption, suitable choice of functional groups, and a high density of functional groups to increase the sorptive properties for target analytes. Polymers with suitable analyte sorption characteristics can be obtained commercially for most analytes of interest with the exception of hydrogen bond acid polymers for sorption of hydrogen bond basic vapors. Of the few polymers that are commercially available (e.g., polyvinylalcohol, polyphenol, and fomblin zdol), either the physical properties are not ideal with glass transition temperatures above room temperature, the hydrogen bond acidity is relatively weak, or the density of functional groups is low.

Fluorinated polymers with hydroxyl groups as part of the polymer repeating unit and, in particular, polymers containing the hexafluoroisopropanol (HFIP) functional group are a well established class of hydrogen bond acid polymers. (See McGill, R. A.; Abraham, M. H.; Grate, J. W. CHEMTECH 1994, 24 (9), 27; Ballantine, D. S.; Rose, S. L.; Grate, J. W.; Wohltjen, H. Anal. Chem. 1986, 58, 3058; Snow, A. W.; Sprague, L. G.; Soulen, R. L.; Grate, J. W.; Wohltjen, H. J. Appl. Pol. Sci., 1991, 43, 1659; Houser, E. J.; McGill, R. A.; Mlsna, T. E.; Nguyen, V. K.; Chung, R.; Mowery, R. L. Proc. SPIE, Detection and Remediation Technologies for Mines and Minelike Targets IV, Orlando, Fla., 1999, 3710, 394–401; Houser, E. J.; McGill, R. A.; Nguyen, V. K.; Chung, R.; Weir, D. W. Proc. SPIE, Detection and Remediation Technologies for Mines and Minelike Targets V, Orlando, Fla., 2000, 4038; Houser, E. J.; Mlsna, T. E.; Nguyen, V. K.; Chung, R.; Mowery, R. L.; McGill, R. A. Talanta, 2001, 54, 469; Grate, J. W.; Patrash, S. J.; Kaganove, S. N.; Wise, B. M. Anal. Chem. 1999, 71, 1033; all of which are incorporated herein by reference). The polymer fluoropolyol (FPOL) has become a standard material for many polymer based chemical sensor applications requiring hydrogen bond-acid polymers. (See: Ballantine, D. S.; Rose, S. L.; Grate, J. W.; Wohltjen, H. Anal. Chem. 1986, 58, 3058; Snow, A. W.; Sprague, L. G.; Soulen, R. L.; Grate, J. W.; Wohltjen, H. J. Appl. Pol. Sci., 1991, 43, 1659; all of which are incorporated herein by reference). Recently reported polymers such as BSP3, SXFA, and CS3P2 have yielded improvements in sensitivity and response time relative to FPOL. (See: Houser, E. J.; McGill, R. A.; Mlsna, T. E.; Nguyen, V. K.; Chung, R.; Mowery, R. L. Proc. SPIE, Detection and Remediation Technologies for Mines and Minelike Targets IV, Orlando, Fla., 1999, 3710, 394–401; Houser, E. J.; McGill, R. A.; Nguyen, V. K.; Chung, R.; Weir, D. W. Proc. SPIE, Detection and Remediation Technologies for Mines and Minelike Targets V, Orlando, Fla., 2000, 4038; all of which are incorporated herein by reference).

Determining and/or monitoring the presence of certain chemical species within a particular environment, e.g., pollutants, toxic substances and other predetermined compounds, is becoming of increasing importance with respect to such areas as defense, health, environmental protection, resource conservation, police and fire-fighting operations, and chemical manufacture. Devices for the molecular recognition of noxious species or other analytes typically include (1) a substrate and (2) a molecular recognition coating upon the substrate. These devices may be used, for example, as stand-alone chemical vapor sensing devices or as a detector for monitoring different gases separated by gas chromatography. Molecular recognition devices are described in Grate et al., Sensors and Actuators B, 3, 85–111 (1991); Grate et al., Analytical Chemistry, Vol. 65, No. 14, Jul. 15, 1993; Grate et al., Analytical Chemistry, Vol. 65, No. 21, Nov. 15, 1993; and Handbook of Biosensor and Electronic Noses, ed. Kress-Rogers, CRC Press, 1996; all of which are incorporated herein by reference.

Frequently, the substrate is a piezoelectric material or an optical waveguide, which can detect small changes in the mass or refractive index, respectively. One illustrative example of a device that relies upon selective sorption for molecular recognition is known as a surface acoustic wave (SAW) sensor. SAW devices function by generating mechanical surface waves on a thin slab of a piezoelectric material, such as quartz, that oscillates at a characteristic resonant frequency when placed in a feedback circuit with a radio frequency amplifier. The oscillator frequency is measurably altered by small changes in mass and/or elastic modulus at the surface of the SAW device.

SAW devices can be adapted to a variety of gas and liquid phase analytical problems by designing or selecting specific coatings for particular applications. The use of chemoselective polymers for chemical sensor applications is well established as a way to increase the sensitivity and selectivity of a chemical sensor with respect to specific classes or types of analytes. Typically, a chemoselective polymer is designed to contain functional groups that can interact preferentially with the target analyte through dipole—dipole, van der Waals, or hydrogen bonding forces. For example, strong hydrogen bond donating characteristics are important for the detection of species that are hydrogen bond acceptors, such as toxic organophosphorus compounds. Increasing the hydrogen bond acidity and the density of hydrogen bond acidic binding sites in the coating of a sensor results in an increase in selectivity and sensitivity of the sensor for hydrogen bond basic analytes.

Chemoselective films or coatings used with chemical sensors have been described by McGill et al. in *Chemtech, Vol.* 24, No. 9, 27–37 (1994), incorporated herein by reference. The materials used as the chemically active, selectively absorbent layer of a molecular recognition device have often been polymers, as described in Hansani in *Polymer Films in Sensor Applications* (Technomic, Lancaster, Pa. 1995). For example, Ting et al. investigated polystyrene substituted with hexafluoroisopropanol (HFIP) groups for its compatibility with other polymers in *Journal of Polymer Science: Polymer Letters Edition*, Vol. 18, 201–209 (1980). Later, Chang et al. and Barlow et al. investigated a similar material for its use as a sorbent for organophosphorus vapors, and examined its behavior on a bulk quartz crystal monitor device in *Polymer Engineering and Science*, Vol. 27, No. 10, 693–702 and 703–15 (1987). Snow et al. (*NRL Letter Report,* 6120–884A) and Sprague et al. (*Proceedings of the* 1987 *U.S. Army Chemical Research Development and Engineering Center Scientific Conference on Chemical Defense Research*, page 1241) reported making materials containing HFIP that were based on polystyrene and poly(isoprene) polymer backbones, where the HFIP provided strong hydrogen bond acidic properties. These materials were used as coatings on molecular recognition devices, such as SAW sensors, and showed high sensitivity for organophosphorus vapors. However, both the parent polymers and the HFIP-containing materials were glassy or crystalline at room temperature. Because vapor diffusion may be retarded in glassy or crystalline materials, the sensors produced were slow to respond and recover. Additional information is reported in *Polym. Eng. Sci.,* 27, 693 and 703–715 (1987).

Grate et al. in *Analytical Chemistry*, Vol. 60, No. 9, 869–75 (1988), which is incorporated herein by reference, discloses a compound called "fluoropolyol" (FPOL), which is useful for detecting organophosphorus compounds. FPOL has the formula:

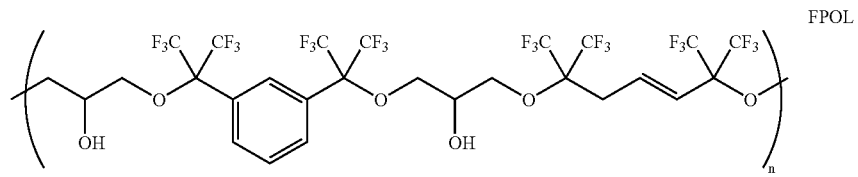

An HFIP-containing polymer based on a polysiloxane backbone was described and demonstrated to be a good hydrogen-bond acid by Abraham et al., "Hydrogen Bonding. XXIX. The Characterisation of Fourteen Sorbent Coatings for Chemical Microsensors Using a New Solvation Equation", *J. Chem. Soc., Perkin Trans.* 2, 369–78 (1995), incorporated herein by reference. The polysiloxane backbone provided a material with a Tg well below room temperature. However, physical properties were not quantified.

Grate, U.S. Pat. No. 5,756,631, incorporated herein by reference, discloses the use of HFIP-substituted siloxane polymers having the structure:

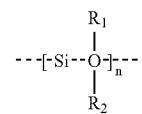

wherein $R_2$ has the formula —$(CH_2)_{m-1}$—CH=CH—$CH_2$—$C(CF_3)_2$—OH, n is an integer greater than 1, $R_1$ is a monovalent hydrocarbon radical, and m is 1 to 4.

Grate et al., U.S. Pat. No. 6,015,869; Jay W. Grate et al., "Hybrid Organic/Inorganic Copolymers with Strongly Hydrogen-Bond Acidic Properties for acoustic Wave and Optical Sensors," *Chem. Mater.* 9, 1201–1207 (1999); Jay W. Grate et al., "Hydrogen Bond Acidic Polymers for Surface Acoustic Wave Vapor Sensors and Arrays," *Anal. Chem.* 71, 1033–1040 (1999); and Igor Levitsky et al., "Rational Design of a Nile Red/Polymer Composite Film for Fluorescence Sensing of Organophosphonate Vapors Using Hydrogen Bond Acidic Polymers," *Anal. Chem.* 73, 3441–3448 (2001); all of which are incorporated herein by reference, disclose a strongly hydrogen bonding acidic, sorbent oligomer or polymer having a glass-to-rubber transition temperature below 25° C. The polymers have (1) fluoroalkyl-substituted bisphenol segments containing interactive groups and (2) oligodimethylsiloxane segments. These siloxane polymers are said to provide improved coatings and vapor sorption compositions for chemical sensors that are sensitive, reversible and capable of selective absorptions for particular vapors, particularly the hydrogen bond accepting vapors, such as organophosphorus compounds.

The present invention discloses a newly discovered class of carbosilane polymers that can be used to produce hydrogen bond acidic coatings for chemical sensor applications. There has been no previously reported use of polycarbosilanes as hydrogen bond acidic coatings or material for any type of chemical sensor or collector applications. Use of the carbosilane polymers of the present invention that possess highly functionalized units can result in significant selectivity and sensitivity improvements.

Further, the chemoselective carbosilane polymer materials of the present invention exhibit, not only improved sensitivity to organophosphorus species, but also high selectivity and sensitivity toward nitroaromatic vapors, and are thus also useful for detecting the presence of explosives. Conventional explosives, such as trinitrotoluene (TNT), hexahydro-1,3,5-trinitro-1,3,5-triazine (RDX), and octahydro-1,3,5-trinitro-1,3,5,7-tetrazocine (HMX), may be contained in unexploded munitions, e.g., buried below the surface of the ground. Such munitions exude or leak vapors of the explosive. These vapors are typically concentrated in the surrounding soil and then migrate to the surface where they can be detected by the compounds, devices and methods disclosed by the present invention.

It is well known that dogs can be used to locate land mines demonstrating that the canine olfactory system is capable of detecting and identifying explosive related analyte signatures. In order to improve land mine detection capability, the use of sensors for the detection of chemical vapors associated with explosives is of great interest. Of particular interest in developing chemical sensors is the ability to detect unexploded ordnance, e.g., the polynitroaromatic compounds that are frequently present in the chemical signature of land mines.

SUMMARY OF THE INVENTION

This invention relates to the preparation of new linear and branched chemoselective carbosilane polymer materials for chemical sensor, chromatography, dosimeter, analyte collector, and air filtration applications.

According to a first aspect of the present invention, there is provided a carbosilane polymer with pendant and terminal groups that are functionalized with halogen substituted alcohol or phenol groups, having the general structure:

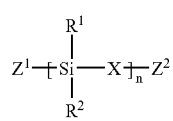

wherein n is an integer greater than 1;
wherein at least one of $R^1$ and $R^2$ is a pendant group having at least one element independently selected from the group consisting of alkyl, alkenyl, alkynyl, and aryl groups, or combinations thereof, and having at least one halogen substituted alcohol or phenol groups attached thereto;

wherein any said $R^1$ and $R^2$ aryl groups are attached to said $[Si-X-]_n$ either directly or through a short hydrocarbon chain;

wherein any remaining said $R^1$ or $R^2$ group is a hydrocarbon or carbosilane group;

wherein X is a polymer backbone component selected from the group consisting of alkylene, alkenylene, alkynylene, arylene groups, and combinations thereof; and wherein $Z^1$ and $Z^2$ are end groups independently selected from the group consisting of alkyl, alkenyl, alkynyl, aryl, alkyl silanes, aryl silanes, hydroxyl, silicon hydride, alkoxides, phenols, halogen substituted alcohols, halogen substituted phenols, organosilyl, and combinations thereof.

According to a second aspect of the invention, there is provided a carbosilane polymer with pendant and terminal aryl groups that are functionalized with halogen substituted alcohol or phenol groups that are primarily designed for the sorption of organophosphonate esters, nitroaromatics, and other hydrogen-bonding basic analytes.

According to a third aspect of the invention, there is provided a device for selective molecular recognition, the device comprising a sensing portion, wherein the sensing portion includes a substrate or multiple substrates having coated thereon a layer, the layer comprising any one of the polymeric compounds of the invention.

According to another aspect of the invention, there is provided a method of detecting hydrogen bond basic analytes such as the organophosphonate esters or nitroaromatic compounds, comprising the steps of:
(a) contacting the molecules of such an analyte with the sensing portion of the device of the invention;
(b) collecting the molecules on the layer of the device, the molecules altering a specific physical property of the layer; and
(c) detecting the amount of change with respect to the physical property from before the contacting step (a) and after the collecting step (b).

According to yet another aspect of the invention, there is provided a chemical vapor collector comprising an amount of any one of the polymeric compounds of the invention effective to collect hydrogen bond basic vapors or nitroaromatic compounds.

DETAILED DESCRIPTION OF THE PREFERRED EMBODIMENTS

The present invention relates to the preparation of a new class of linear and branched chemoselective polymers that can be used to produce hydrogen bond acidic materials for chemical sensor, chromatography, analyte dosimeter, analyte collector, and air filtration applications. There have been no prior reports on similar uses for polycarbosilane and polysilylene materials with functionalized pendant aryl or groups. Use of these carbosilane polymers with highly functionalized units can result in significant selectivity and sensitivity improvements. These polymers have pendant and terminal groups that are functionalized with halogen substituted alcohol or phenol groups. Pendant aryl groups can be attached to the carbosilane polymer backbone either directly or through a hydrocarbon chain. These carbosilane polymeric materials are primarily designed for the chemical detection of organophosphonate esters (nerve agents and precursors), and nitroaromatics (explosives) but may also have applications in detecting other hydrogen-bonding basic analytes.

One of the improved and novel features of the present invention is that there are no hydrogen bond basic heteroatoms present in the polymer backbone. Heteroatoms, such as oxygen or nitrogen, can bind HFIP groups thereby decreasing available analyte bonding sites. In addition, the lack of heteroatoms, such as oxygen, in the present inventions polymer backbone results in a diminished sensitivity to hydrogen bond acid analytes, such as water from ambient humidity. Water vapor is a ubiquitous interferent and, therefore, any decrease in sensitivity to humidity is a significant improvement over the prior art. In designing sorptive polymers for nitroaromatic analytes in the present invention, HFIP functionalized terminal alkene groups or aryl rings were chosen as the interactive portion of the polymer because of the high hydrogen-bonding acidity of these groups. Polynitroaromatic compounds possess multiple basic sites through the oxygen atoms of the nitro group and the hydrogen-bond acidity of the hexafluoroisopropanol group is complimentary to these basic sites. The hydrogen bond acidity of alcohols increases with the number of perfluoroalkyl groups bound to the carbinol group making the HFIP group an excellent hydrogen bond acid. In addition, the hydrogen bond basicity imparted by the oxygen atom of the hydroxyl group is substantially reduced thereby increasing the selectivity of the hydroxyl group for hydrogen bond basic analytes.

In addition to contributing to the hydrogen bond acidity of the hydroxyl group in the polymer, the fluorocarbon group also imparts substantial chemical stability to the polymer due to the inertness of the C—F bond. A further advantage is the steric bulk of the $CF_3$ groups and phenyl rings which hinders access to the polymer backbone thereby decreasing van der Waals interactions between analyte molecules and the polymer backbone. Use of the aromatic pendant groups provides two additional advantages in that they generally lead to more hydrogen bond acidic systems than comparable saturated hydrocarbons and they are better spatially oriented to interact with the electron rich oxygen atoms of the nitro groups on the nitroaromatic analytes.

The nitroaromatic analytes are dipolar and highly polarizable molecules that exhibit hydrogen-bond basic properties increasing with the number of nitro groups on the molecule. The hydrogen bond acidic polymers are designed to interact with the available electron density located on the oxygen atoms of the nitro groups of the polynitroaromatics. The hydrogen-bond basicities of some common nitroaromatics are 0.25 for 3-nitrotoluene, 0.47 for 2,4-dinitrotoluene and 0.61 for 2,4,6-trinitrotoluene demonstrating that the basicity of additional nitro groups is additive. These hydrogen bond basicities can be compared to those of hexane (0.0) and toluene (0.14). It should also be noted that the nitroaromatics are relatively large molecules and therefore also have significant van der Waals interactions with other materials.

According to a first aspect of the present invention, there is provided a carbosilane polymer with pendant and terminal groups that are functionalized with halogen substituted alcohol or phenol groups, having the general structure:

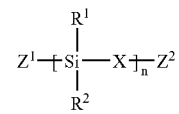

wherein n is an integer greater than 1;
wherein at least one of $R^1$ and $R^2$ is a pendant group having at least one element independently selected from the group consisting of alkyl, alkenyl, alkynyl, and aryl groups, or combinations thereof, and having at least one halogen substituted alcohol or halogen substituted phenol group attached thereto;
wherein any said $R^1$ and $R^2$ aryl groups are attached to said $[Si-X-]_n$ either directly or through a short hydrocarbon chain;
wherein any remaining said $R^1$ or $R^2$ group is a hydrocarbon or carbosilane pendant group;
wherein X is a divalent polymer backbone component selected from the group consisting of hydrocarbons, carbosilanes, hydrocarbons with halogen substituted alcohol substituents, hydrocarbons with halogen substituted phenol substituents, hydrocarbons with phenol substituents, carbosilanes with halogen substituted alcohol substituents, carbosilanes with halogen substituted phenol substituents, carbosilanes with phenol substituents, and combinations thereof; and
wherein $Z^1$ and $Z^2$ are end groups independently selected from the group consisting of alkyl, alkenyl, alkynyl, aryl, alkyl silanes, aryl silanes, hydroxyl, phenols, silicon hydride, alkoxides, halogen substituted alcohols, halogen substituted phenols, organosilyl, and combinations thereof.

In a preferred embodiment, $R^2$ is a substituted methyl group. In a more preferred embodiment, X is a linear alkyl chain having between 1 and 12 carbons. In an even more preferred embodiment, $R^1$ is a 3-phenylpropyl group having two halogen substituted alcohol or phenol groups attached to the aryl group, and wherein X is a 3 carbon chain. In a further preferred embodiment, the halogen substituted alcohol or phenol groups are $-C(CF_3)_2OH$ groups. In an even further preferred embodiment, $Z^1$ is either a 3-phenylpropyl group having at least one halogen substituted alcohol or halogenated phenol group attached thereto, and $Z^2$ is an allyl bis(3-phenylpropyl)silyl group having at least one halogen substituted alcohol or phenol group attached thereto. In another preferred embodiment, the aryl groups of $R^1$ and $R^2$ are independently selected from either a phenyl ring having two halogen substituted alcohol or halogenated phenol group. In yet another preferred embodiment, $R^1$ or $R^2$ is an allyl group having one or two halogen substituted alcohol or phenol groups attached thereto. In further preferred embodiments, the carbosilane polymer has any of the following structures:

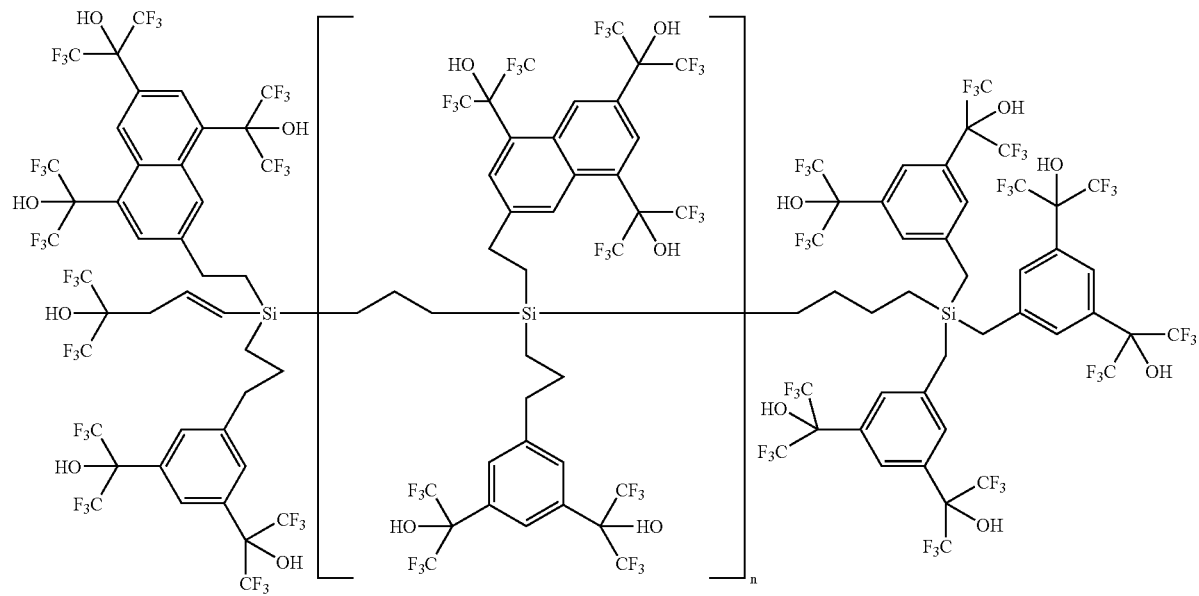
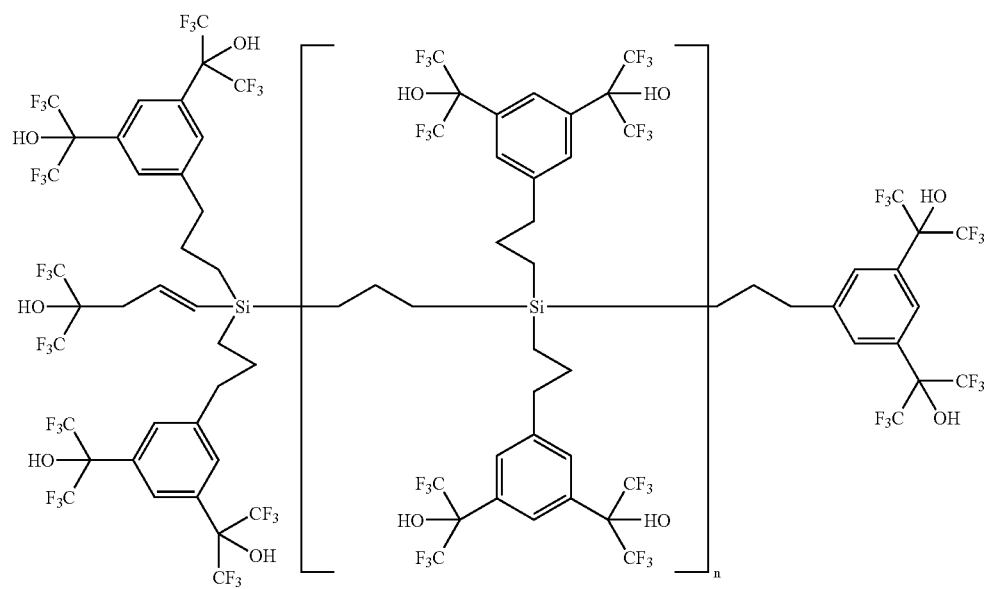

-continued

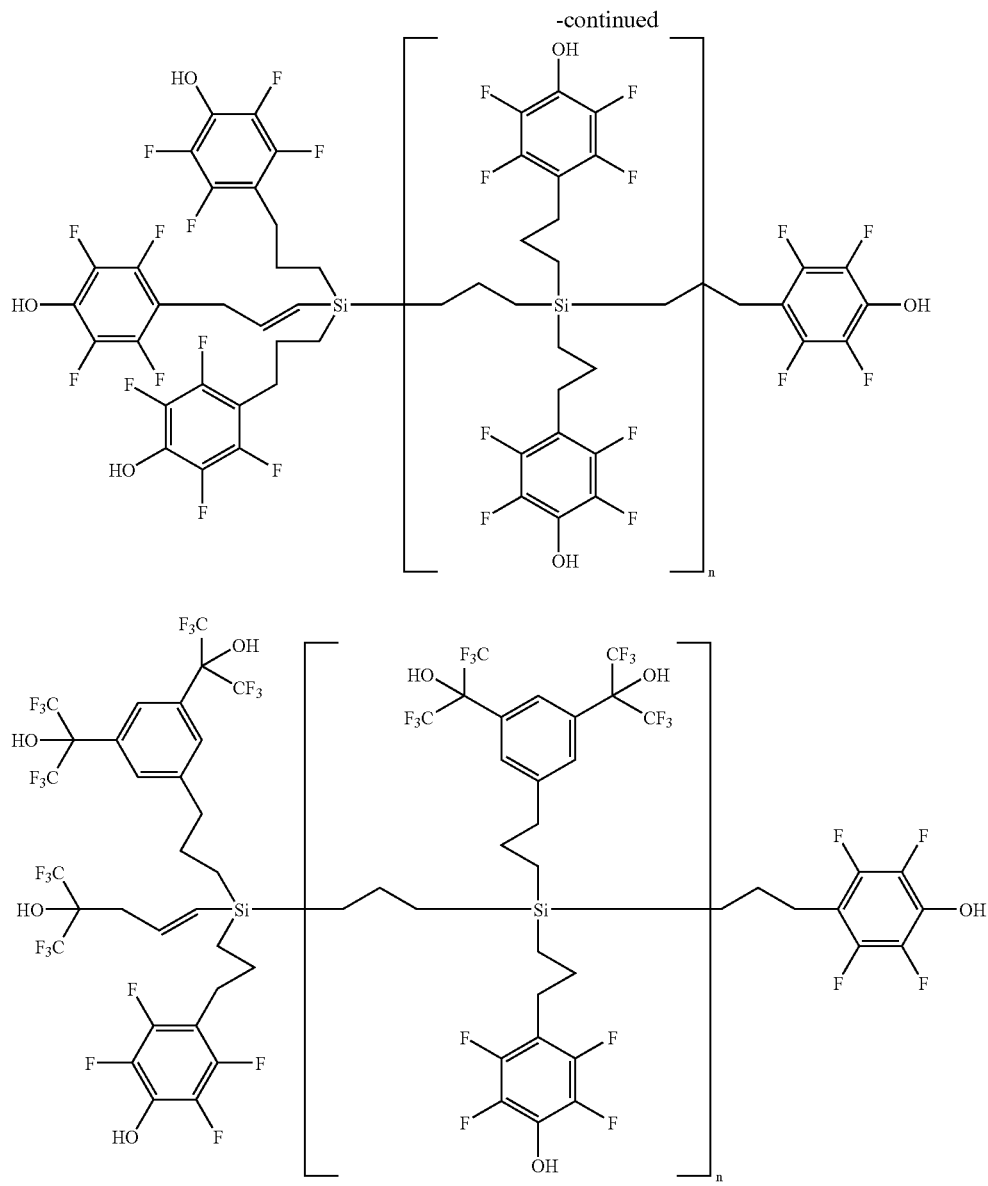

In order to develop hydrogen bond acid polymers with improved physicochemical properties, preparation of new polymers with higher density of perfluoroalcohol functional groups and physical properties amenable to rapid vapor sorption/desorption kinetics have been targeted. Aryl rings or allyl groups are preferred as a framework for fluoroalcohol functionalization. Hexafluoro-2-propanol substituted allyl groups tend to exhibit a higher sorptivity for water molecules, however the sorptivity is lower for arene hydrocarbons interferents such as toluene.

The compounds of the present invention can be synthesized by reacting hexafluoroacetone with the parent molecule, comprising a core polymer and a number of pendant unsaturated groups, taking advantage of the reactivity of perfluoroketones with terminally unsaturated groups, as described by Urry et al., *J. Org. Chem.*, Vol. 33, 2302–2310 (1968). According to Urry, "Hexafluoroacetone gives stepwise reactions with olefins

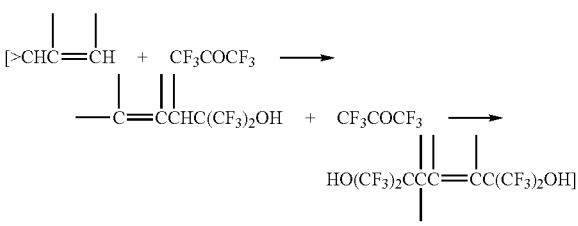

some of which, surprisingly, occur at 25°" C.

A substituted carbosilane polymer can be prepared by taking the following steps:
 (a) selecting a starting material independently selected from the group consisting of aryl substituted metallated hydrocarbons and aryl substituted metallated carbosilanes;

(b) reacting said aryl substituted metallated hydrocarbon or said aryl substituted metallated carbosilane with an alkenyl or alkynyl dichlorocarbosilane, thereby forming an unsaturated carbosilane intermediate having the structure:

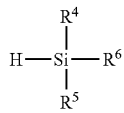

wherein $R^4$ and $R^5$ are said independently selected aryl substituted hydrocarbons or carbosilane groups derived from aryl substituted metallated hydrocarbon or said aryl substituted metallated carbosilanes; and wherein $R^6$ is an alkenyl or alkynyl group;

(c) performing a hydrosilation reaction on said unsaturated carbosilane intermediate in the presence of a hydrosilation catalyst, thereby forming a arylalkyl substituted carbosilane polymer intermediate having the structure:

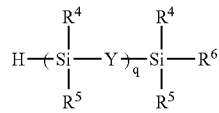

wherein q is an integer greater than or equal to 1; and wherein Y is a hydrocarbon polymer backbone component derived from hydrosilation of said $R^6$;

(d) reacting said arylalkyl substituted carbosilane polymer intermediate with an alkene or alkyne in the presence of a hydrosilation catalyst, thereby forming an arylalkyl substituted polycarbosilane having the structure:

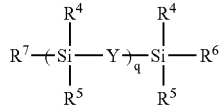

wherein $R^7$ is an alkyl or alkenyl group; and (e) reacting said arylalkyl substituted polycarbosilane with hexafluoroacetone, thereby forming said substituted carbosilane polymer.

In a preferred embodiment, the hydrosilation catalyst is hexachloroplatinic acid.

A substituted carbosilane polymer can also be prepared by taking the following steps:

(a) selecting a starting material independently selected from the group consisting of substituted metallated hydrocarbons and substituted metallated carbosilanes;

(b) reacting said substituted metallated hydrocarbon or said substituted metallated carbosilane with $H_2SiCl_2$, thereby forming a disubstituted silane or carbosilane intermediate having the structure:

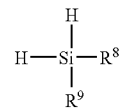

wherein $R^8$ and $R^9$ are said selected substituted metallated hydrocarbon or said substituted metallated carbosilane;

(c) performing a hydrosilation reaction between said disubstituted silane or carbosilane intermediate and a doubly unsaturated species in the presence of a hydrosilation catalyst, thereby forming a polycarbosilane intermediate having the structure:

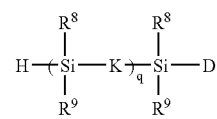

wherein q is an integer greater than or equal to 1;

wherein K is a hydrocarbon or carbosilane fragment derived from double hydrosilation of said doubly unsaturated species;

wherein D is a hydrocarbon or carbosilane fragment derived from single hydrosilation of said doubly unsaturated species;

(d) reacting said polycarbosilane intermediate with an alkene or alkyne in the presence of a hydrosilation catalyst, thereby forming an substituted polycarbosilane having the structure:

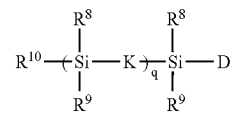

wherein $R^{10}$ is an alkyl or alkenyl group derived from said hydrosilation reaction between said alkene or alkyne and said polycarbosilane intermediate; and (e) reacting said substituted polycarbosilane with hexafluoroacetone, thereby forming said substituted carbosilane polymer.

Alternatively, a substituted carbosilane polymer can be prepared by taking the following steps:

(a) selecting a starting material independently selected from the group consisting of substituted metallated hydrocarbons and substituted metallated carbosilanes;

(b) reacting said substituted metallated hydrocarbon or said substituted metallated carbosilane with an appropriate silane or carbosilane, thereby forming a disubstituted silane or carbosilane intermediate having the structure:

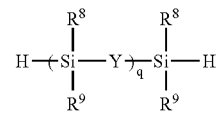

wherein $R^8$ and $R^9$ are said selected substituted metallated hydrocarbon or said substituted metallated carbosilane; and wherein q=0 to 10;

(c) performing a hydrosilation reaction between said disubstituted silane or carbosilane intermediate and a doubly unsaturated species in the presence of a hydrosilation catalyst, thereby forming a polycarbosilane intermediate having the structure:

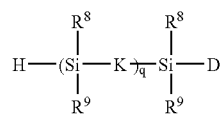

wherein q is an integer greater than or equal to 1;

wherein K is a hydrocarbon or carbosilane fragment derived from double hydrosilation of said doubly unsaturated species;

wherein D is a hydrocarbon or carbosilane fragment derived from single hydrosilation of said doubly unsaturated species;

(d) reacting said polycarbosilane intermediate with an alkene or alkyne in the presence of a hydrosilation catalyst, thereby forming an substituted polycarbosilane having the structure:

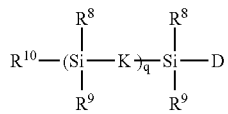

wherein $R^{10}$ is an alkyl or alkenyl group derived from said hydrosilation reaction between said alkene or alkyne and said polycarbosilane intermediate; and (e) reacting said substituted polycarbosilane with hexafluoroacetone, thereby forming said substituted carbosilane polymer.

In a preferred embodiment, the hydrosilation catalyst is hexachloroplatinic acid. In an even more preferred embodiment, the substituted metallated hydrocarbon or substituted metallated carbosilane each contain at least one aryl group.

In a preferred embodiment, the doubly unsaturated species has one of the following structures:

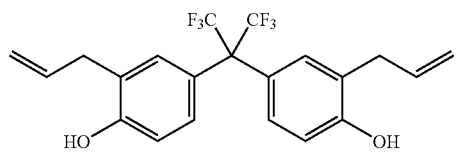

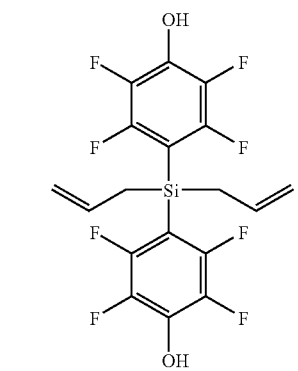

In a preferred embodiment, the substituted carbosilane polymer has one of the following structures:

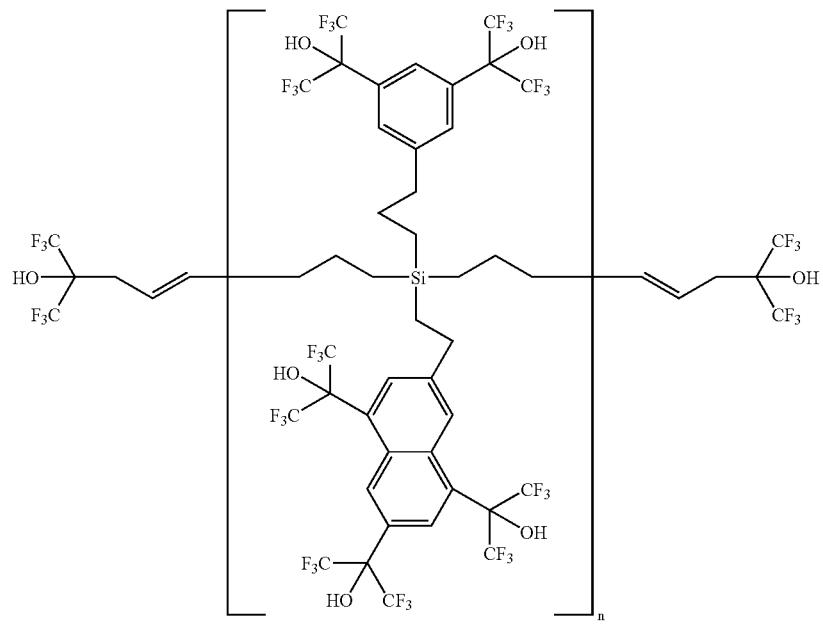

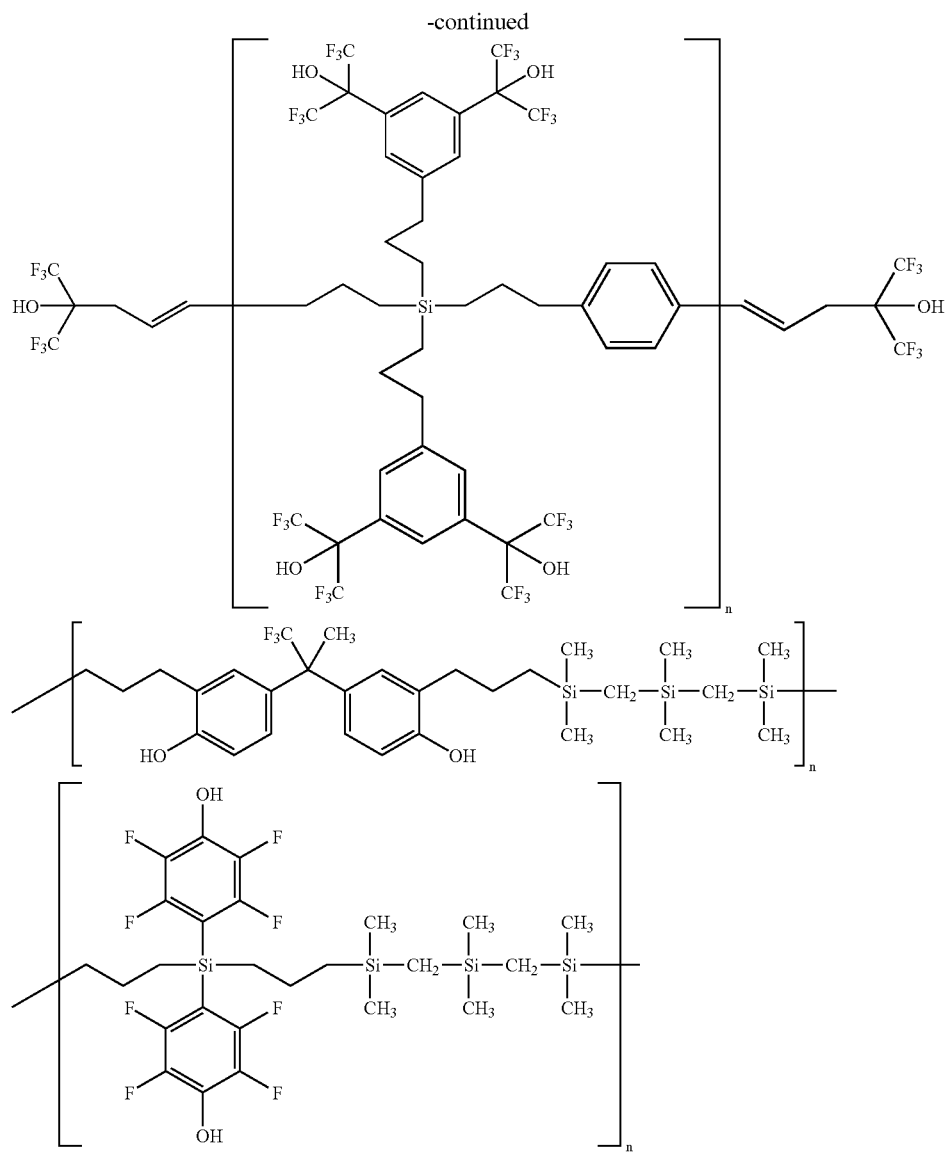

Alternatively, a substituted carbosilane polymer can be prepared by taking the following steps:
(a) reacting an appropriate cyclic carbosilane precursor, such as a silacyclobutane or 1,3-disilacyclobutane, with a suitable initiator or catalyst to perform a ring opening polymerization reaction, thereby forming an intermediate polymer having the structure:

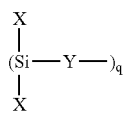

wherein q is an integer greater than or equal to 1;
wherein Y is a hydrocarbon or carbosilane fragment derived from the ring opening polymerization of a cyclic carbosilane precursor;
wherein X is a readily substitutable group such as a halide or alkoxide;

(b) selecting a starting material independently selected from the group consisting of substituted metallated hydrocarbons and substituted metallated carbosilanes;
(c) reacting said substituted metallated hydrocarbon or said substituted metallated carbosilane with an appropriate silane or carbosilane, thereby forming a disubstituted silane or carbosilane intermediate having the structure:

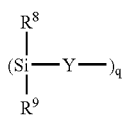

wherein $R^8$ and $R^9$ are said selected substituted metallated hydrocarbon or said substituted metallated carbosilane; and wherein q=1 to 10;

(d) reacting said substituted polycarbosilane with hexafluoroacetone, thereby forming said substituted carbosilane polymer.

Alternatively, a substituted carbosilane polymer can be prepared by taking the following steps:
(a) reacting an appropriate cyclic carbosilane precursor, such as a silacyclobutane or 1,3-disilacyclobutane, with a suitable initiator or catalyst to perform a ring opening polymerization reaction, thereby forming an intermediate polymer having the structure:

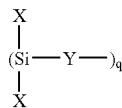

wherein q is an integer greater than or equal to 1;
wherein Y is a hydrocarbon or carbosilane fragment derived from the ring opening polymerization of a cyclic carbosilane precursor;
wherein X is a readily substitutable group such as a halide or alkoxide;
(b) selecting a starting material independently selected from the group consisting of substituted metallated protected phenols and dimetallated halogenated phenols;
(c) reacting said substituted metallated protected phenol or said dimetallated halogenated phenol with an appropriate silane or carbosilane, thereby forming a disubstituted silane or carbosilane intermediate having the structure:

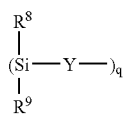

wherein $R^8$ and $R^9$ are said selected substituted metallated protected phenol or said substituted dimetallated halogenated phenol; and wherein q=1 to 10;
(d) deprotecting, if needed, and acidification of said intermediate polycarbosilane, thereby forming said substituted carbosilane polymer.

Ring opening polymerization is a well established method for the formation of carbosilane polymers. See, for example, Interrante, L. V. and Shen, Q. Chap. 10 in Silicon Containing Polymers, Jones, R. G.; Ando, W.; Chojnowski, J. (Eds.), Kluwer Academic Press (2000).

A wide variety of standard methods are routinely used for protection of phenolic hydroxyl groups during multistage synthetic reactions. These methods are well known to those skilled in the art. For examples see VOGEL's Textbook of Practical Organic Chemistry, 5th Ed., Longman Singapore Publishers (1989).

Once synthesized, these polymers can be coated to a controlled film thickness on a substrate, either alone or mixed with a solvent or similarly functionalized polymer. Useful substrates include planar chemical sensors, such as surface acoustic wave (SAW) substrates; optical fibers; and the interior surfaces of capillaries. The substrate chosen is based on the sensing mechanism being used.

The principle of operation of an acoustic wave transducer device involves the production of an acoustic wave that is generated on the surface or through the bulk of a substrate material and allowed to propagate. To generate the acoustic wave typically requires a piezoelectric material. Applying a time varying electric field to the piezoelectric material will cause a synchronous mechanical deformation of the substrate with a coincident generation of an acoustic wave in the material. The time varying electric field is generated in the surface by the action of the time varying electrical field applied through one or more electrodes that are connected to the piezoelectric material via one or more metal wire bonds and to an electrical circuit. Another electrode or electrodes receives the wave at a distance from the first electrode or electrodes. The second electrode or electrodes is also connected via metal wire bonds to the electrical circuit and the piezoelectric material. Such devices are operable in a frequency range of about 1 kilohertz to 10 gigahertz, preferably from about 0.2 megahertz to about 2 gigahertz and, more preferably, in the range of between about 200 to 1000 megahertz.

For piezoelectric sensors, piezoelectric substrates known in the art are useful in accordance with the invention, e.g., ST-cut quartz. In addition to quartz crystals, piezoelectric ceramics, such as those of the barium titanate and lead titanate zirconate families, are suitable substrates. These include $LiNbO_3$; $BaTiO_3$; 95 wt. % $BaTiO_3$/5% $GaTiO_3$; 80 wt. % $BaTiO_3$/12% $PbTiO_3$/8% $CaTiO_3$; $PbNb_2O_6$; $Na_{0.5}K_{0.5}NbO_3$; $Pb_{0.94}Sr_{0.06}(Ti_{0.48}Sr_{0.52})O_3$; and $Pb_{0.94}(Ti_{0.48}Sr_{0.52})O_3$. In some cases, the substrate may comprise a piezoelectric coating material, such as ZnO or AlN, applied to a non-piezoelectric material, such as silicon or silicon carbide surface used in a micromachined device. The piezoelectric properties of these and other suitable materials are provided in CRC Handbook of Materials Science, Vol. III, Charles T. Lynch, CRC Press: Boca Raton, 198 (1975).

The sensing portion of an acoustic wave device of the invention is the area under the chemoselective layer, where the chemoselective layer covers the transducer. The area of the sensing portion of such a device can be on the order of about 0.0001–10 cm².

An optical waveguide chemical sensor consists of a light source, an optical waveguide, a chemoselective film or layer, and a detector to analyze the light after interacting with the layer. The waveguide is used to propagate light to a sensing portion of the device that contains the chemoselective layer. The light travels towards this coating and interacts with it. If the analyte being detected is present in the layer, the optical characteristics of the light may be altered, and the change is detected by some optically sensitive detector. In certain cases, the chemoselective layer may consist of a composite of polymer and one or more dyes.

An optical chemical sensor, commonly referred to as an optrode, includes a light source such as a semiconductor laser, light-emitting diode, or a halogen lamp; an optical waveguide such as a fiber optic or a planar waveguide substrate; a chemoselective layer deposited on the sensing portion of the optrode exposed to an analyte; and a detector to monitor the optical characteristics of the optrode. Sorption of the analyte to the chemoselective layer modifies the optical characteristics of the optrode, and this is detected as a change in refractive index or light intensity at one or more wavelengths of light. Optical sensors, optical fibers and optical wave guides are useful and are known in the art.

Fiber optic waveguides for sensor applications are commonly manufactured from silica glass or quartz as the core of the fiber. Surrounding this core is a cladding material that exhibits a lower refractive index than the fiber core to achieve internal reflectance. The chemoselective layer is typically applied at the distal tip of the fiber optic or along the side of the fiber optic where a portion of the outer cladding material has been removed.

Planar waveguide optical sensors use a planar substrate device as a light guide. The use of a planar waveguide normally involves the use of evanescent wave techniques to take advantage of the large active surface area. Many of these sensors use the fluorescent properties of a chemoselective layer and are thus called Total Internal Reflection Fluorescence (TIRF) sensors.

Preferably, SAW devices are used as the substrate for the device of the invention. Particularly preferred SAW devices are 915 MHz two-port resonators made of ST-cut quartz with aluminum metallization and a thin silicon dioxide overcoat. SAW resonators and oscillator electronics to drive them are available from RF Monolithics and SAWTEK Inc.

Before application of a coating to form the sensor portion of the device of the invention, the substrate is cleaned. The cleaning procedure typically involves rinsing the device in an organic solvent and then subjecting it to plasma cleaning, as is well-known. Optionally, the substrate can be silanized with a material such as diphenyltetramethyldisilazane (DPTMS) by immersing the cleaned substrate surface in liquid DPTMS, placing the immersed surface into a partially evacuated chamber while heating the device to about 170° C. for about 12 hours. The silanized substrate is then removed and solvent cleaned with, for example, toluene, methanol, chloroform, or a physical or serial combination thereof, before applying the layer of the sensor portion of the device.

The method used for coating the compounds of the invention onto a substrate is not critical, and various coating methods known in the art may be used. Typically, the coating is applied to the substrate in solution, either by dipping, spraying or painting, preferably by an airbrush or spin coating process. The concentration of the compound of the invention in the coating solution should be sufficient to provide the viscosity most appropriate for the selected method of coating, and may easily be determined empirically. The solvent used, although not critical, should be sufficiently volatile as to facilitate quick and easy removal, but not so volatile as to complicate the handling of the coating solution prior to being deposited on the substrate. Examples of useful solvents include, for example, hexane, chloroform, methanol, toluene, tetrahydrofuran, and water. J. W. Grate and R. A. McGill in *Analytical Chemistry*, Vol. 67, No. 21, 4015–19 (1995), the subject of which is incorporated herein by reference, describe making chemical acoustic wave detectors by applying a thin film to a surface acoustic wave device. The thickness of the chemoselective layer preferably does not exceed that which would reduce the frequency of a chemical sensor operating at 250 megahertz by about 250 kilohertz and, typically, is in the range of about 0.5 nm to 10 microns, preferably in the range of 1 to 300 nm.

The coating may comprise a single layer or multiple layers. With multiple layers, a layer containing the compound of the invention may be combined with at least one other layer that provides pores suitable for physically eliminating some chemical species of large size that are not to be monitored.

The process of sorption plays a key role in the performance of chemical sensors for gas phase analysis. For example, microsensors, which consist of a physical transducer and a selective sorbent layer, sense changes in the physical properties, such as mass, in the sorbent layer on the surface of the transducer, due to the sorption of analyte molecules from the gas phase into the sorbent layer. Coating material properties that are known to elicit a detectable SAW sensor response are mass (i.e., as determined by the thickness and density of the coating), elasticity, viscoelasticity, conductivity, and dielectric constant. Changes in these properties can also result in changes in the attenuation (i.e., loss of acoustic power) of the wave. In some situations, monitoring attenuation may be preferable to monitoring velocity. Alternatively, there are some situations where simultaneously monitoring both velocity and attenuation can be useful. In any event, it is the modification of the sensed properties of the sorbent layer, as a result of analyte sorption, that results in the measurable response when analyte molecules are present in the gas or liquid phases being monitored. SAW devices coated with compounds of the invention are capable of detecting mass changes as low as about 100 pg/cm 2. Further, vapor diffusion is rapid providing fast detection in a sub second time frame.

Sensor selectivity, the ability to detect a chemical species in an environment containing other chemical species, is generally determined by the ability of the coated layer to specifically sorb the species to be detected to the exclusion of others. For most coatings, selectivity is obtained based on providing stronger chemical interactions between the coated layer and the target species than occurs between the layer and species that are not to be detected. The method of selectively detecting the presence of a chemical entity within an environment comprises (a) placing the sensing portion of the device of the invention in the environment and (b) detecting changes in the coated layer of the sensing portion of the device. The environment may be gaseous or liquid.

More than one device may be provided. For example, a plurality of sensor portions could be used in a sensor array with, e.g., associated control devices and software, in a manner similar to conventional procedures employed with sensor arrays.

After an initial sensing has taken place, the coated sensor layer can be purged or cleaned by a second stream, allowing sensing of a new third stream to take place. For example, air, water- or acid-base solutions could be used as purging or cleaning solutions, depending on the species being detected and the nature of the layer.

In the devices and methods of the invention, the polymeric compounds are excellent sorbents for both hydrogen bond basic vapors, such as organophosphorus compounds, and also for nitroaromatic materials, such as explosives. It is expected that the chemical sensor systems of the present invention could weigh between 1–32 ounces and could, therefore, be easily mounted on a remote or robotic vehicle for automatically detecting buried explosives or munitions. Alternatively, such a device would also be useful for remotely detecting chemical agents or explosives secreted upon a person intending the destruction of private property and/or personnel, such as, for example, at crowded public places like airports or arenas where terrorist activities may be suspected.

If desired, it is possible to increase the concentration of explosive vapors contained in the area being monitored, i.e., speed up their release from buried or otherwise hidden munitions or explosives, by irradiating the area with electromagnetic radiation. Increasing the concentration of vapor in the soil or other environment surrounding a munition will produce a stronger signal following the reaction with sensor portion of the device of the present invention.

The chemoselective carbosilane polymers of the invention exhibit high selectivity and sensitivity toward nitroaromatic vapor, due at least in part to the sensitivity and selectivity of the multiple halogen substituted alcohols or phenols that are present. The presence of these functional groups is also directly responsibility for the sensitivity of these materials to hydrogen bond basic vapors. The functionalized polycarbosilane compounds of the invention also have the advantage of high-yield preparation methods, ready purification, in addition to having an increased density of functional groups, as compared with previously disclosed polymeric coatings.

Moreover, the flexibility in the synthesis of these materials allows one to tailor a wide variety of related chemoselective compounds.

EXAMPLES

Example 1

Synthesis Procedures

Preparation of Monomers

Allylbis(phenpropyl)silane: To a 500 mL Schlenk flask containing magnesium turnings (2.71 g, 111.5 mmol) in diethyl ether (250 mL) was added dropwise a solution of 1-bromo-3-phenylpropane (20.0 g, 100.5 mmol) over 4 hours. The resulting pale yellow solution was stirred for 10 hours at room temperature then cooled to 0° C. and treated with allyldichlorosilane (7.085 g, 50 mmol) via syringe. The resulting white slurry was stirred for 4 hours at room temperature then heated to reflux for 20 minutes. After filtration and aqueous work-up, the solvent was removed in vacuo to give a colorless liquid. Yield: 86%. FTIR (NaCl, cm$^{-1}$): 3083, 3066, 3021, 2927, 2842, 2069, 1598, 1569, 1488, 1456, 1142, 1067, 1025, 987, 920, 891, 834, 745, 701. $^1$H NMR (CDCl$_3$): 7.28, 7.17, 5.74, 4.89, 4.54, 3.74, 2.62, 1.67, 0.64.

Bis(phenpropyl)silane: To a 250 mL Schlenk flask containing magnesium turnings (0.70 g, 28.8 mmol) in diethyl ether (50 mL) was added dropwise a solution of 1-bromo-3-phenylpropane (5.0 g, 25.1 mmol) in 75 mL of diethyl ether over 2 hours. The resulting pale yellow solution was stirred for 12 hours at room temperature then cooled to 0° C. and treated with 25% dichlorosilane in xylenes (5.0 g, 5.8 mL, 12.5 mmol) via syringe. The resulting white slurry was stirred for 24 hours at room temperature. After filtration and aqueous work-up, the solvent was removed in vacuo to give a colorless liquid. Yield: 84%. $^1$H NMR (CDCl$_3$): 7.39,7.22, 7.19,7.09, 4.09,2.71, 1.90,0.78.

Preparation of Polymers

Polybis(phenpropyl)silylenepropylene: A 100 mL Schlenk flask containing a solution of allylbis(phenpropyl) silane (5.0 g) in 40 mL of THF was treated with a catalytic amount (0.80 mg) of hexachloroplatinic acid. The resulting solution was stirred at room temperature for 48 hours. The solution was filtered and the solvent removed in vacuo leaving a viscous, colorless oil. Yield: 92%. FTIR (NaCl, cm$^{-1}$): 3084, 3061, 3025, 3001, 2924, 2856, 2795, 1603, 1496, 1453, 1411, 1342, 1235, 1169, 1140, 1122, 1094, 1070, 1030, 1002, 985, 922, 903, 826, 774, 745, 698.

Polybis(phenpropyl)silylenehexamethylene (P-CS6P2): A 100 mL Schlenk flask containing a solution of bis(phenpropyl)silane (2.0 g) and 1,5-hexadiene (0.70 g, mmol) in 30 mL of THF was treated with a catalytic amount (1 mg) of hexachloroplatinic acid. The resulting solution was stirred at room temperature for 72 hours. The solution was filtered and the solvent removed in vacuo leaving a viscous, colorless oil. Yield: 96%. $^1$H NMR (CDCl$_3$): 7.28, 7.24, 7.19, 7.09, 2.68, 1.69, 1.42, 0.69.

Functionalization of Polymers

General Procedure for the Functionalization of Polymers with Hexafluoroacetone (HFA)

A portion (2–10 g) of the polymer was intimately mixed with a catalytic amount of aluminum chloride (approx. 50 mg/g of polymer) and placed into a mild steel cylinder with a stir bar and the cylinder evacuated. Hexafluoroacetone (0.5–2.0 g) was vacuum transferred into the steel cylinder and the resulting mixture heated to 80° C. for 48 hours. Note: hexafluoroacetone is highly toxic and is dangerous under pressure. After cooling to room temperature, the volatiles were removed and the resulting polymer purified by extraction into CHCl$_3$ and washed with water. The CHCl$_3$ polymer solution was filtered and the solvent removed in vacuo leaving a pale brown polymer. The presence of the —(CF$_3$)$_2$COH group is verified by the presence of an O—H stretching absorption near 3500–3600 cm$^{-1}$ in the FTIR spectrum of the functionalized polymer.

Reaction of Polybis(Phenpropyl)Silylenepropylene with HFA (CS3P2):

Yield: 96%. FTIR (NaCl, cm$^{-1}$): 3592, 3523.

Reaction of Polybis(Phenpropyl)Silylenehexamethylene with HFA (CS6P2):

Yield: 96%. FTIR (NaCl, cm$^{-1}$): 3599, 3521.

Example 2

Applying a Thin Film to a SAW Device

SAW devices are cleaned in a Harrick plasma cleaner prior to polymer film application. Aerosol spray-coated films of the present invention in solvent are applied to a SAW device using an airbrush supplied with compressed dry nitrogen. The frequency change of the SAW device operating in an oscillator circuit is monitored during deposition, using the change in frequency as a measure of the amount of material applied. After application, the films are annealed at 50° C. overnight in an oven. Spray-coated films are examined by optical microscopy with a Nikon microscope using reflected light Nomarski differential interference contrast.

Example 3

Detection of Basic Vapors with a Compound-Coated SAW Device

The polymers of the present invention are applied to SAW devices and tested against organic vapors at various concentrations. Upon exposure to a vapor, the coated acoustic wave devices undergo a shift in frequency that is proportional to the amount of vapor sorbed by the compound. Times to steady state response, corresponding to equilibrium partitioning of the vapor into the compound layer, are typically under 15 seconds using a vapor delivery system. From frequency shift data for a vapor at multiple concentrations, calibration curves are constructed. The calibration curves are nonlinear, which is consistent with hydrogen bonding interactions at a finite number of sites in the polymers of the present invention.

Obviously, many modifications and variations of the present invention are possible in light of the above teachings. Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A carbosilane polymer having the general structure:

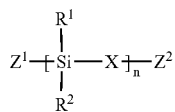

wherein n is an integer greater than 1;
wherein at least one of $R^1$ and $R^2$ is a pendant group having at least one element independently selected from the group consisting of alkyl, alkenyl, alkynyl, and aryl groups, or combinations thereof, and having at least one phenol, halogen substituted phenol group, or aryl hydrocarbon with a halogen-substituted alcohol substituent attached thereto;
wherein any said $R^1$ and $R^2$ aryl groups are attached to said [Si—X—]$_n$ either directly or through a short hydrocarbon chain;
wherein any remaining said $R^1$ or $R^2$ group is a hydrocarbon or carbosilane pendant group;
wherein X is a divalent polymer backbone component selected from the group consisting of hydrocarbons carbosilanes, hydrocarbons with halogen substituted alcohol substituents, hydrocarbons with halogen substituted phenol substituents carbosilanes with halogen substituted alcohol substituents, carbosilanes with halogen substituted phenol substituents, and combinations thereof; and
wherein $Z^1$ and $Z^2$ are end groups independently selected from the group consisting of alkyl, alkenyl, alkynyl, aryl, alkyl silanes, aryl silanes, hydroxyl, silicon hydride, alkoxides, phenols, halogen substituted alcohols, halogen substituted phenols, organosilyl, and combinations thereof.

2. The carbosilane polymer of claim 1, wherein said $R^2$ is a substituted methyl group.

3. The carbosilane polymer of claim 2, wherein said X is a linear alkyl chain having between 1 and 12 carbons.

4. The carbosilane polymer of claim 3, wherein said $R^1$ is a 3-phenylpropyl group having two said halogen substituted phenol groups attached to said aryl group, and wherein said X is a 3 carbon chain.

5. The carbosilane polymer of claim 1, wherein said $Z^1$ is a 3-phenylpropyl group having at least one said halogen substituted phenol group attached thereto, and said $Z^2$ is an allyl bis(3-phenylpropyl)silyl group having at least one said halogen substituted phenol group attached thereto.

6. The carbosilane polymer of claim 1, wherein said aryl groups of said $R^1$ and $R^2$ are each a benzene ring having two halogen substituted phenol groups attached thereto.

7. The carbosilane polymer of claim 1, wherein said $R^1$ or $R^2$ group is an allyl group having one or two said halogen substituted phenol groups attached thereto.

8. A device for selective molecular detection, the device comprising a sensing portion, wherein said sensing portion includes a substrate having coated thereon a layer, said layer comprising the carbosilane polymer of claim 1.

9. A method of detecting the molecules of a hydrogen bond basic analytes, comprising the steps of:
(a) contacting the molecules of said analyte with a device comprising a sensing portion, wherein said sensing portion includes a substrate having coated thereon a layer, said layer comprising the material of claim 1;
(b) collecting said molecules in said layer, wherein said molecules alter a specific physical property of said layer; and
(c) detecting the amount of change in the physical property from before said contacting step (a) and after said collecting step (b).

10. A collection device for selective molecular sorption for molecules of a hydrogen bond basic analyte, wherein said device comprises the material of claim 1.

11. The carbosilane polymer of claim 1, wherein at least one of $R^1$ and $R^2$ is a pendant group having at least one aryl group independently selected from the group consisting of phenol, halogen substituted phenol, and aryl hydrocarbon with a halogen substituted alcohol substituent.

12. The carbosilane polymer of claim 11, wherein said halogen substituted alcohol substituent is hexafluoroisopropanol.

13. A carbosilane polymer having the following structure:

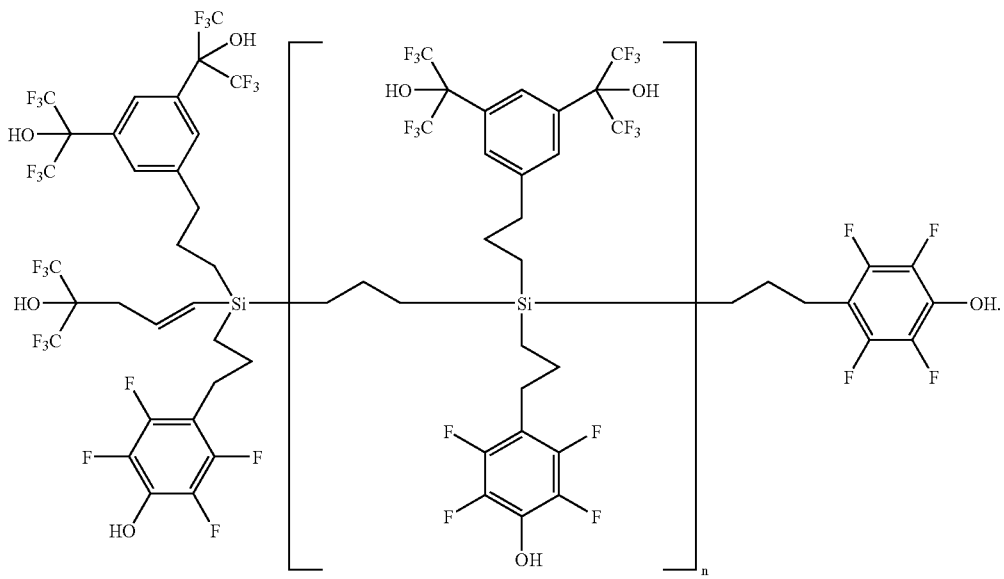

14. A carbosilane polymer having the following structure:

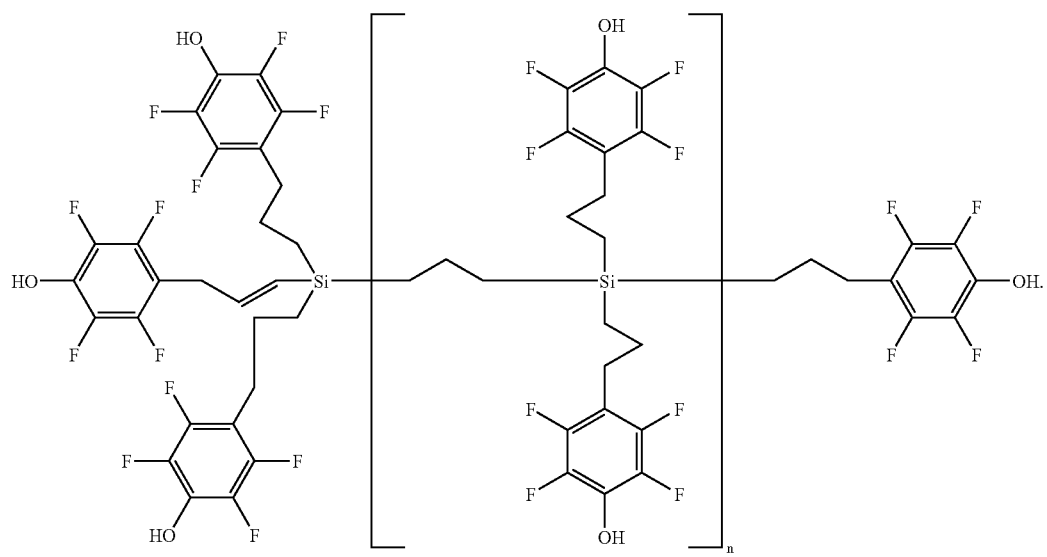

15. A carbosilane polymer having the following structure:

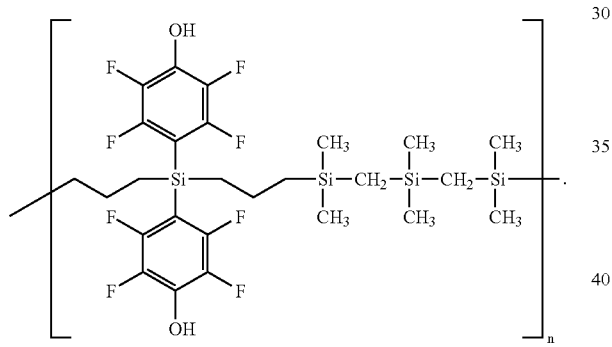

16. A method for making a substituted carbosilane polymer comprising the steps of:
  (a) reacting a cyclic carbosilane precursor with an initiator or catalyst to perform a ring opening polymerization reaction, thereby forming an intermediate polymer having the structure:

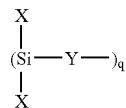

wherein q is an integer greater than or equal to 1;
  wherein Y is a hydrocarbon or carbosilane fragment derived from the ring opening polymerization of a cyclic carbosilane precursor;
  wherein X is a readily substitutable group such as a halide or alkoxide;
  (b) selecting a starting material independently selected from there group consisting of substituted metallated protected phenols and dimetallated halogenated phenols;
  (c) reacting said substituted metallated protected phenol or said dimetallated halogenated phenol with a silane or carbosilane, thereby forming a disubstituted silane or carbosilane intermediate having the structure:

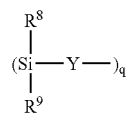

wherein $R^8$ and $R^9$ are said selected substituted metallated protected phenol or said substituted dimetallated halogenated phenol; and wherein q=1 to 10;
  (d) deprotecting, if needed, and acidifying said intermediate polycarbosilane, thereby forming said substituted carbosilane polymer.

* * * * *